(12) United States Patent
Kubo et al.

(10) Patent No.: US 6,700,499 B2
(45) Date of Patent: Mar. 2, 2004

(54) BODY MOTION DETECTOR

(75) Inventors: Nobuo Kubo, Kyoto (JP); Kiichiro Miyata, Kyoto (JP); Hiromi Matsumoto, Kyoto (JP)

(73) Assignee: Omron Corporation, Kyoto (JP)

( * ) Notice: Subject to any disclaimer, the term of this patent is extended or adjusted under 35 U.S.C. 154(b) by 34 days.

(21) Appl. No.: 09/973,978

(22) Filed: Oct. 9, 2001

(65) Prior Publication Data
US 2002/0089425 A1 Jul. 11, 2002

(30) Foreign Application Priority Data

Oct. 16, 2000 (JP) ....................................... 2000-315654
Mar. 30, 2001 (JP) ....................................... 2001-102035

(51) Int. Cl.$^7$ ............................................. G08B 21/00
(52) U.S. Cl. ................................ 340/686.1; 340/573.1; 340/573.7; 600/552; 600/510; 600/553; 73/379.01; 73/379.09; 482/3; 482/74; 482/172
(58) Field of Search .......................... 340/686.1, 573.1; 600/552, 510, 553; 73/379.01, 379.09; 482/3, 74, 172

(56) References Cited

U.S. PATENT DOCUMENTS

| | | | | |
|---|---|---|---|---|
| 5,430,435 A | * | 7/1995 | Hoch et al. .................. | 340/573 |
| 5,694,340 A | * | 12/1997 | Kim ............................. | 364/566 |
| 5,879,309 A | * | 3/1999 | Johnson et al. .............. | 600/552 |
| 5,899,963 A | | 5/1999 | Hutchings .................... | 73/490 |
| 5,955,667 A | | 9/1999 | Fyfe ............................. | 702/145 |
| 6,119,516 A | * | 9/2000 | Hock ........................ | 73/379.01 |

FOREIGN PATENT DOCUMENTS

| | | | | |
|---|---|---|---|---|
| EP | 0 797 169 A1 | 9/1997 | | |
| FR | 2 670 004 | 5/1992 | | |
| WO | 97/10567 | * | 9/1997 | ........... G01C/22/00 |

OTHER PUBLICATIONS

Patent Abstracts of Japan, vol. 005, No. 092 (P–066), Jun. 16, 1981 & JP 56 036787 A (Matsushita Electric Works Ltd), Apr. 10, 1981 abstract.

* cited by examiner

*Primary Examiner*—Daniel J. Wu
*Assistant Examiner*—Tai T. Nguyen
(74) *Attorney, Agent, or Firm*—Beyer Weaver & Thomas LLP

(57) ABSTRACT

A body motion detector, to be attached to or carried by a user for detecting body motions of the user, uses a plurality of sensors each for detecting body motions in a specified direction to output a body motion signal according to the user's body motion. These sensors are disposed so as to detect the body motion in different directions. One of these sensors are selected by carrying out calculations on signals outputted from the sensors. The user's body motion is detected by using selectively output signals from the selected body motion sensor. The body motion detector may also include a component for detecting the orientation of the body motion detector itself from signals outputted from these sensors and another component for detecting the user's body motions by carrying out calculations on the signals outputted from these sensors, corresponding to the orientation as detected by the orientation detecting component.

13 Claims, 20 Drawing Sheets

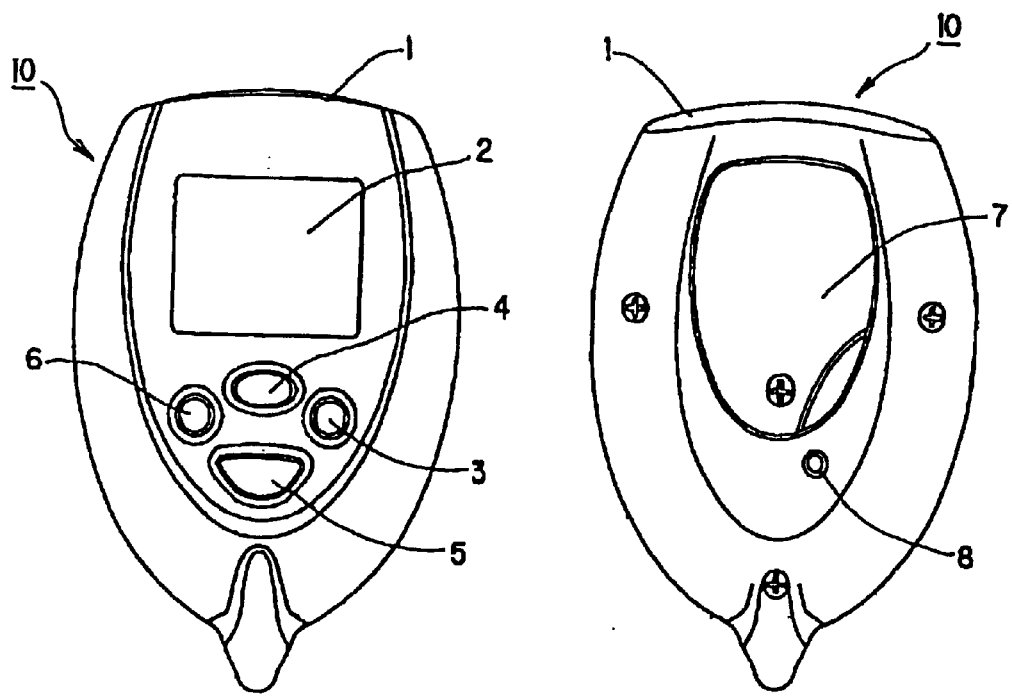
FIG. 1
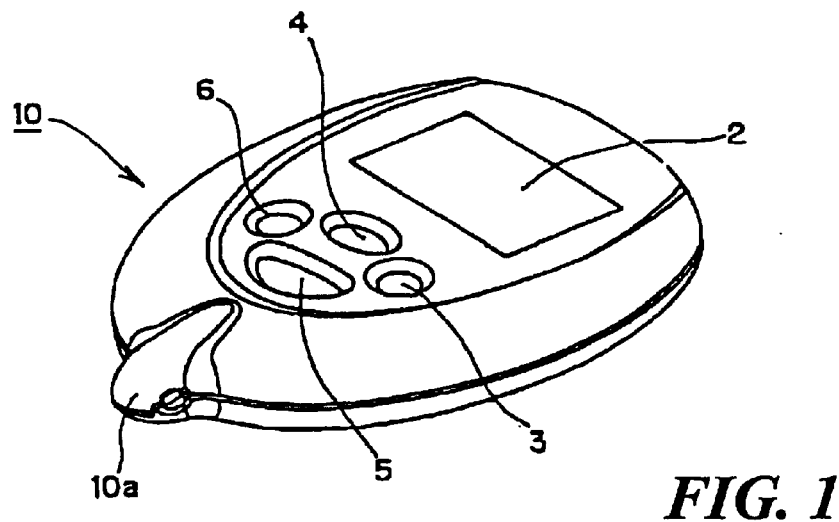
FIG. 2A FIG. 2B

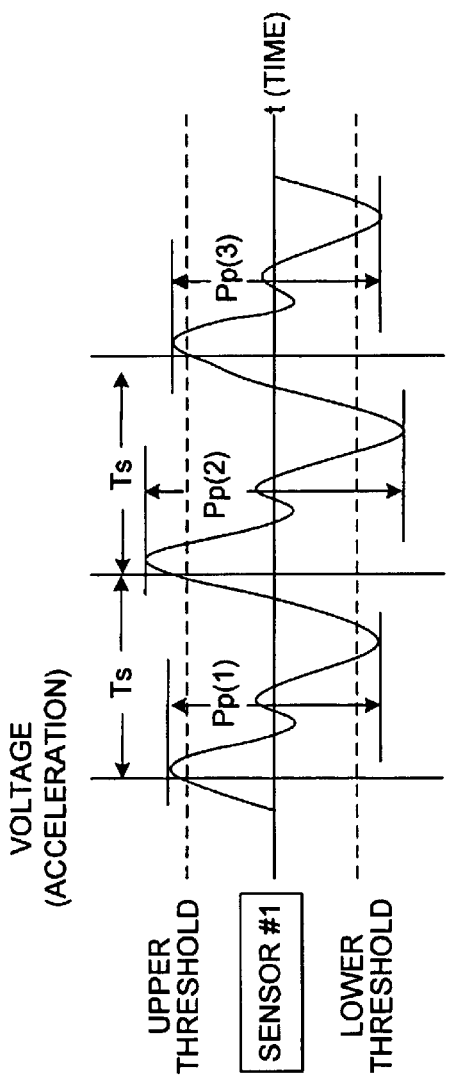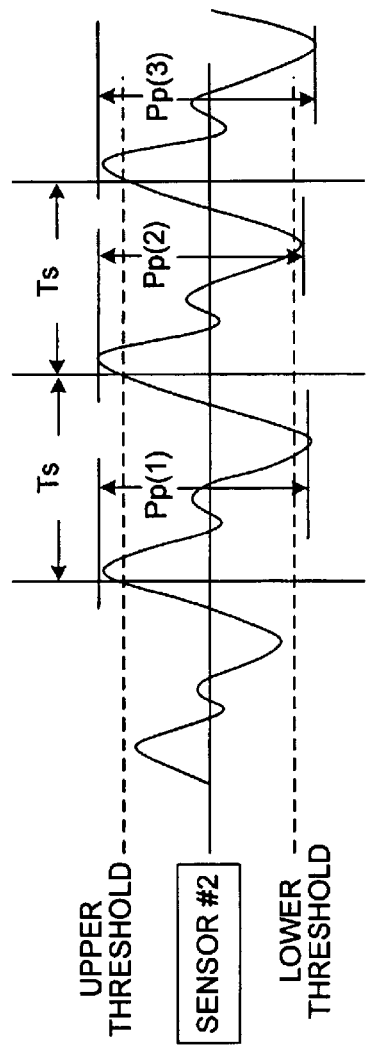

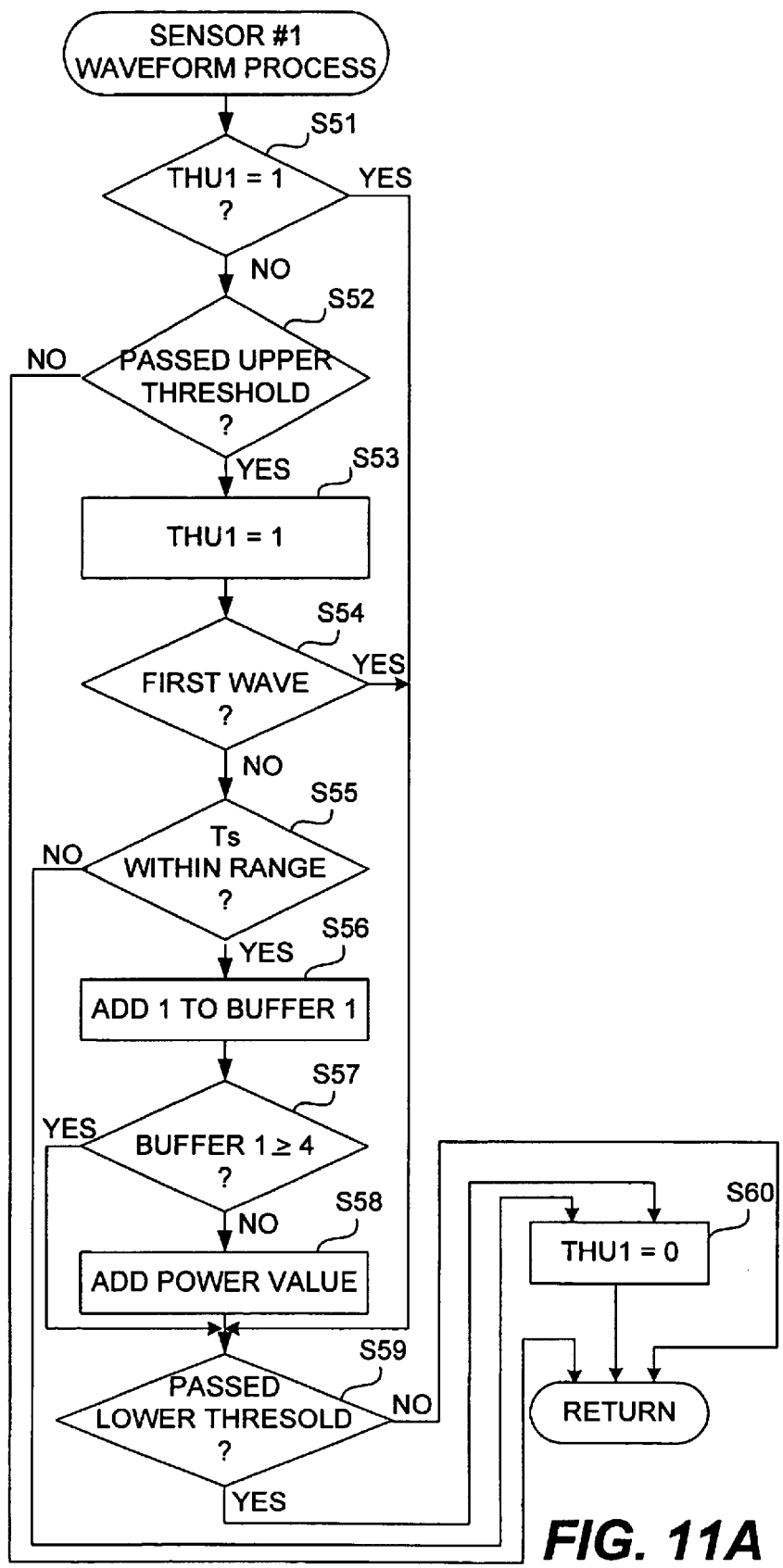

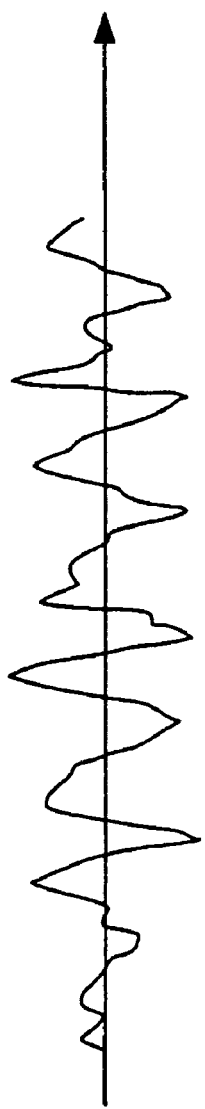
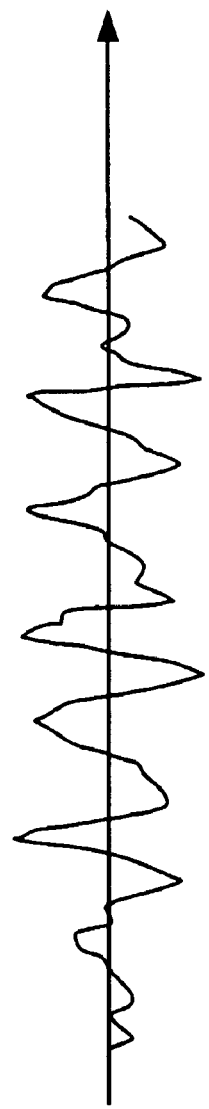
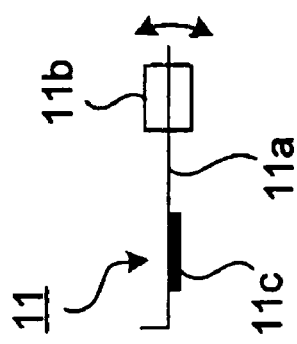
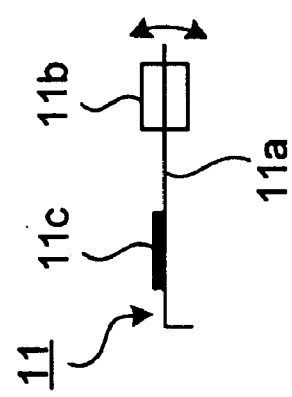
FIG. 16A
FIG. 16B

BODY MOTION DETECTOR

BACKGROUND OF THE INVENTION

This invention relates to a body motion detector comprising a plurality of sensors each for outputting a signal according to a body motion and serving to carry out a measurement by selecting those of the plurality of sensors which are suited for the measurement.

As an example of body motion detector adapted to select output signals (or sensors) out of a plurality of sensors for carrying out a main measurement, Japanese Patent Publication Tokkai 9-223214 disclosed a pedometer characterized as selecting one of output signals from a plurality of sensors on the basis of a signal outputted from a mechanical angle-detecting sensor such as an optical sensor. Japanese Patent Publication Tokkai 11-42220 disclosed a body motion detector adapted to select one of a plurality of sensors for a main measurement when the directions of its attachment is known. A body motion detector of still another kind to be affixed at a fixed position and in a fixed direction, adapted to measure a body motion by using an acceleration sensor with two or three axes for identifying the form of motion such as walking on a horizontal ground, uphill walking and downhill walking, was disclosed in the Proceedings of the 11th Biophysics and Engineering Symposium BPES 96, pp493–496. An acceleration waveform obtained when a person walks with an acceleration sensor with three axes affixed to the waist was analyzed in this report to distinguish different modes of walking. In this experiment, however, the acceleration detector must be affixed securely so as not to change its orientation.

The method of providing a mechanical detector such as an angle-detecting sensor to select an output signal is disadvantageous not only because of its cost of production but also because the detector becomes larger by the space occupied by the angle-detecting sensor. If the detector must be kept at a certain direction, this will limit the position where the detector can be attached. If the detector is attached in a wrong direction, it is not possible to obtain a correct measured result.

SUMMARY OF THE INVENTION

It is therefore an object of this invention, in view of these problems of the prior art technologies, to provide a body motion detector which can be freely attached to or carried by the user and can detect the body motion with high accuracy, independent of the orientation of the detector.

It is another object of this invention to provide such a body motion detector which can be compact and can be produced relatively inexpensively.

A body motion detector according to this invention may be characterized not only as being adapted to be attached to or carried by a user for detecting body motions of the user but also as comprising a plurality of sensors each for detecting body motions of the user in a specified direction to output a body motion signal according to the user's body motion, each of them being disposed so as to detect the body motion in a different direction, and selecting means for selecting one of these sensors by carrying out calculations on signals outputted from these sensors. The body motion detector thus detects the body motion in a specified direction selectively from output signals from the selected body motion sensor. With a body motion detector thus structured, the user's body motion can be detected accurately because the detection is made selectively on the basis of the signals outputted from one of the plurality of sensors selected to be more appropriate than the others for the detection. Since the selection is made by a calculational routine, furthermore, there is no need for an extra component such as an angle detector for detecting the orientation of the body motion detector, the detector as a whole can be made compact and at a lower cost.

The invention also provides a body motion detector comprising not only a plurality of sensors as described above but also orientation detecting means for detecting the orientation of the body motion detector itself from signals outputted from these sensors and body motion detecting means for detecting the user's body motions by carrying out calculations on the signals outputted from these sensors, corresponding to the orientation as detected by the orientation detecting means.

BRIEF DESCRIPTION OF THE DRAWINGS

FIG. 1 is a perspective view of a pedometer embodying this invention;

FIGS. 2A and 2B are respectively a top view and a bottom view of the pedometer of FIG. 1;

FIGS. 8A and 8B are examples of waveforms obtained from the two sensors referenced in the flowchart of FIG. 7;

FIGS. 11A and 11B are flowcharts for waveform processing routines according to the second embodiment of the invention;

FIGS. 16A and 16B show the principle of determining the orientation of a body motion detector according to a sixth embodiment of the invention;

DETAILED DESCRIPTION OF THE INVENTION

Figure 3A:
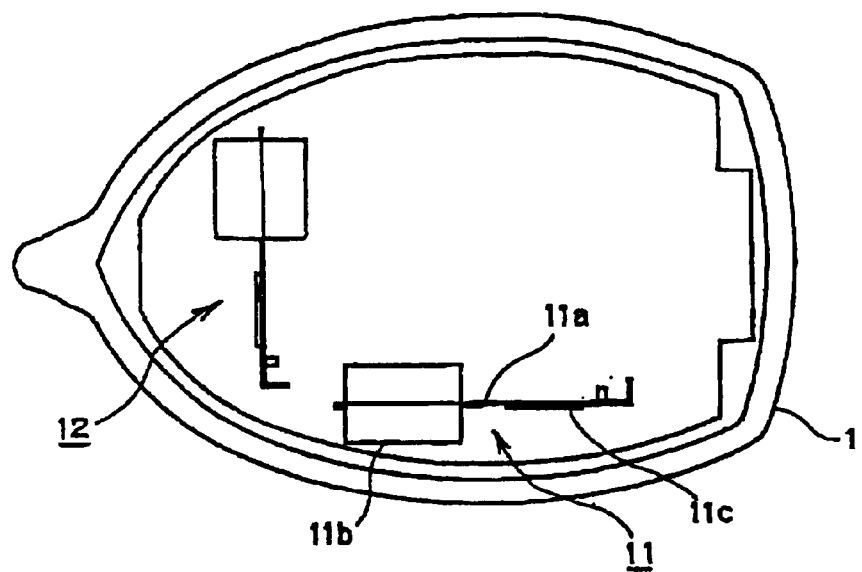
FIGS. 3A and 3B each show an arrangement of body motion sensors inside the case of the pedometer.

FIGS. 1, 2A and 2B show a pedometer 10 as an example of body motion detector embodying this invention, having a case 1 of a flat solid form with a side surface which is elliptically shaped with a portion at one end of its longer axis removed. At the opposite end portion of the longer axis is a protrusion 10a with a hole for passing a string through. A display screen 2 comprising an LCD, a group of switches 3, 4, 5 and 6 (referred to together as the "switches 17" below) are provided on the top surface of the case 1. On the bottom surface of the case are a battery cover 7 and a system reset switch 8.

A certain preferred orientation is usually recommended for a pedometer. The user's manual usually recommends that it should be fastened securely to a belt or a waist position of slacks, a skirt or pants by means of a clip. The pedometer 10 of this invention can make measurements accurately even when it is being carried in a less than ideal manner such as in a pocket, by being hung from the neck or in a brief case.

Figure 3B:
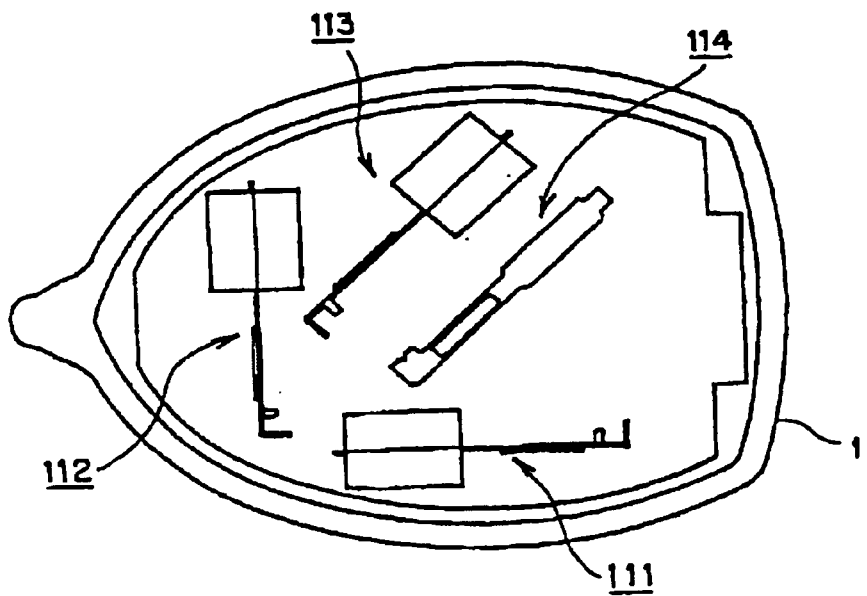

FIGS. 3A and 3B show how body motion sensors may be arranged inside the case 1. Each of the sensors (say, one indicated by numeral 11) is composed of a planar supporting member 11a, a weight 11b at one end of the supporting member 11a and a detector 11c comprising a piezoelectric element such that the deformation (strain) of the supporting member 11a due to the acceleration of the weight 11b caused by a body motion is converted into a voltage signal and taken out.

FIG. 3A shows an example wherein two body motion sensors 11 and 12 are disposed in mutually perpendicular X and Y directions but three or more body motion sensors may be arranged as shown in FIG. 3B. In the example shown in FIG. 3B, two body motion sensors 111 and 112 are disposed in mutually perpendicular X and Y directions, a third body motion sensor 113 is disposed in a direction about 45° from and between the X and Y axes and a fourth body motion sensor 114 is positioned for detecting a body motion in the Z-direction which is perpendicular to the XY plane in which the first three body motion sensors 111, 112 and 113 are placed. The third body motion sensor 113 is effective for detecting body motions in the direction about 45° from and between the X and Y axes because the outputs from the first two body motion sensors 111 and 112 become smaller for a body motion in such a direction.

Figure 4:
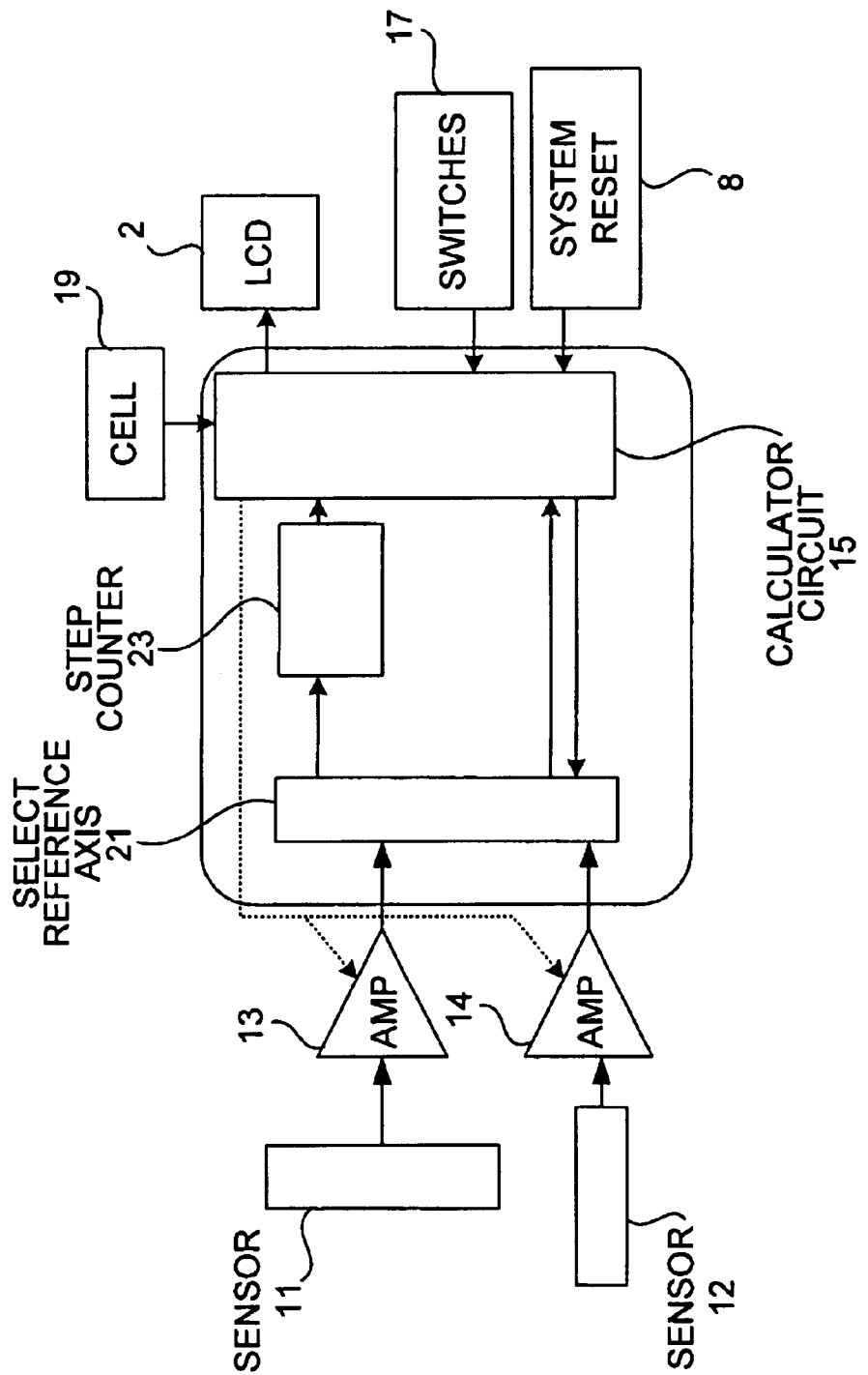
FIG. 4 is a block diagram for showing the inner structure of the pedometer of FIG. 3A.

As shown in FIG. 4, the pedometer of FIG. 3A includes, in addition to the two body motion sensors 11 and 12, amplifier circuits 13 and 14 respectively for amplifying the output voltages of the body motion sensors 11 and 12, a cell 19, an LCD 2 for displaying the time, the step number, the continuous step number, the continuous walking time, consumed calorie number, etc., the switches 17, the system reset switch 8 and a calculator circuit 15 for carrying out the LCD display control, detecting the switch input, sequence control and the control of the power supply.

Signals obtained from the body motion sensors 11 and 12 are inputted to a reference axis selecting part 21 for selecting a reference axis (to be explained below) and the step number is counted by a step counter 23 by using signals associated with the selected axis.

Figure 5:
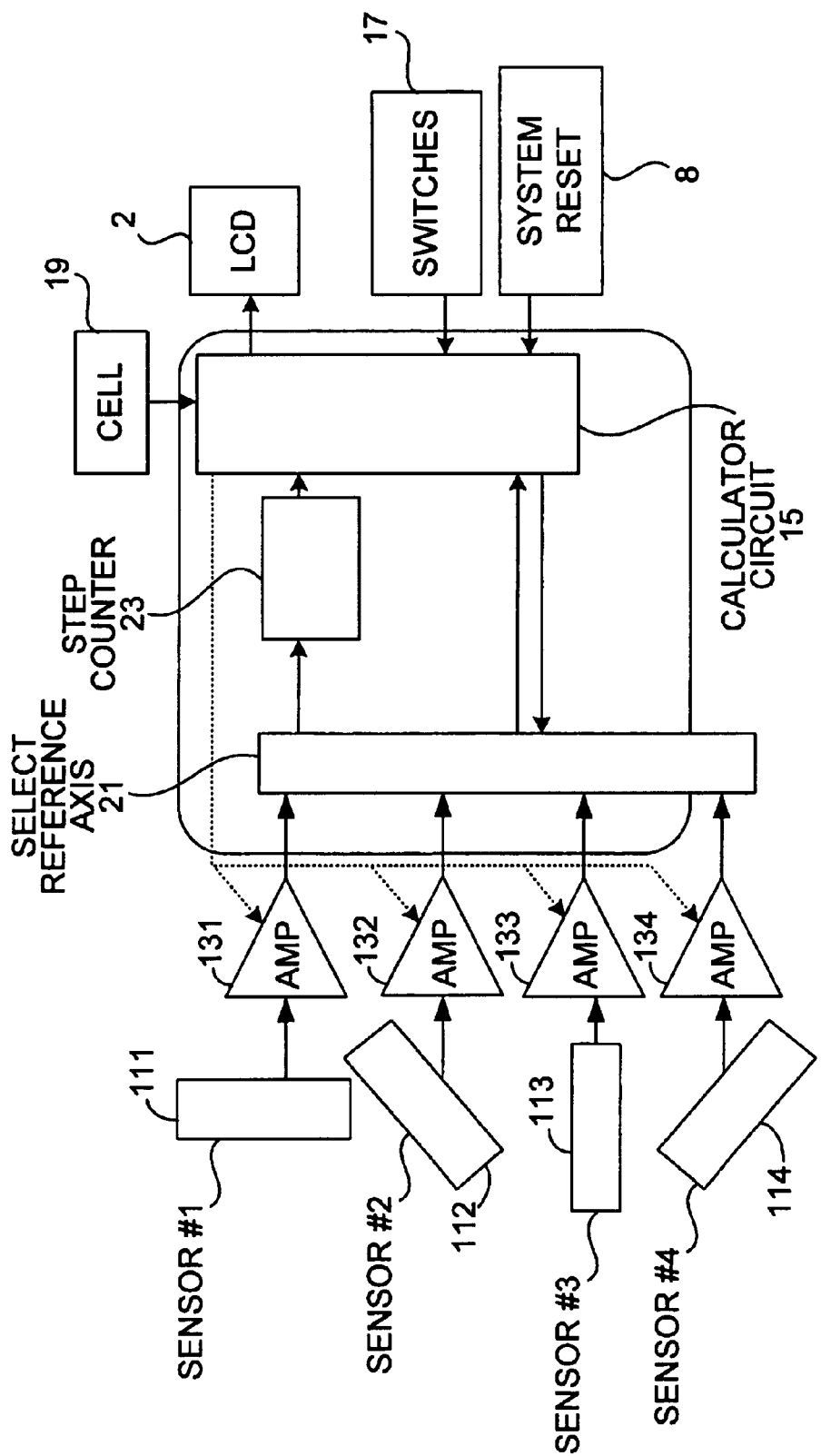
FIG. 5 is a block diagram for showing the inner structure of the pedometer of FIG. 3B.

The pedometer of FIG. 3B includes four amplifier circuits 131, 132, 133 and 134 corresponding to its four body motion sensors 111, 112, 113 and 114, as shown in FIG. 5. In other aspects, the pedometer of FIG. 3B has a similar inner structure as that of FIG. 3A and hence other components will not be explained repetitiously. It is to be noted that the number of body motion sensors to be included is not intended to limit the scope of this invention.

Figure 6:
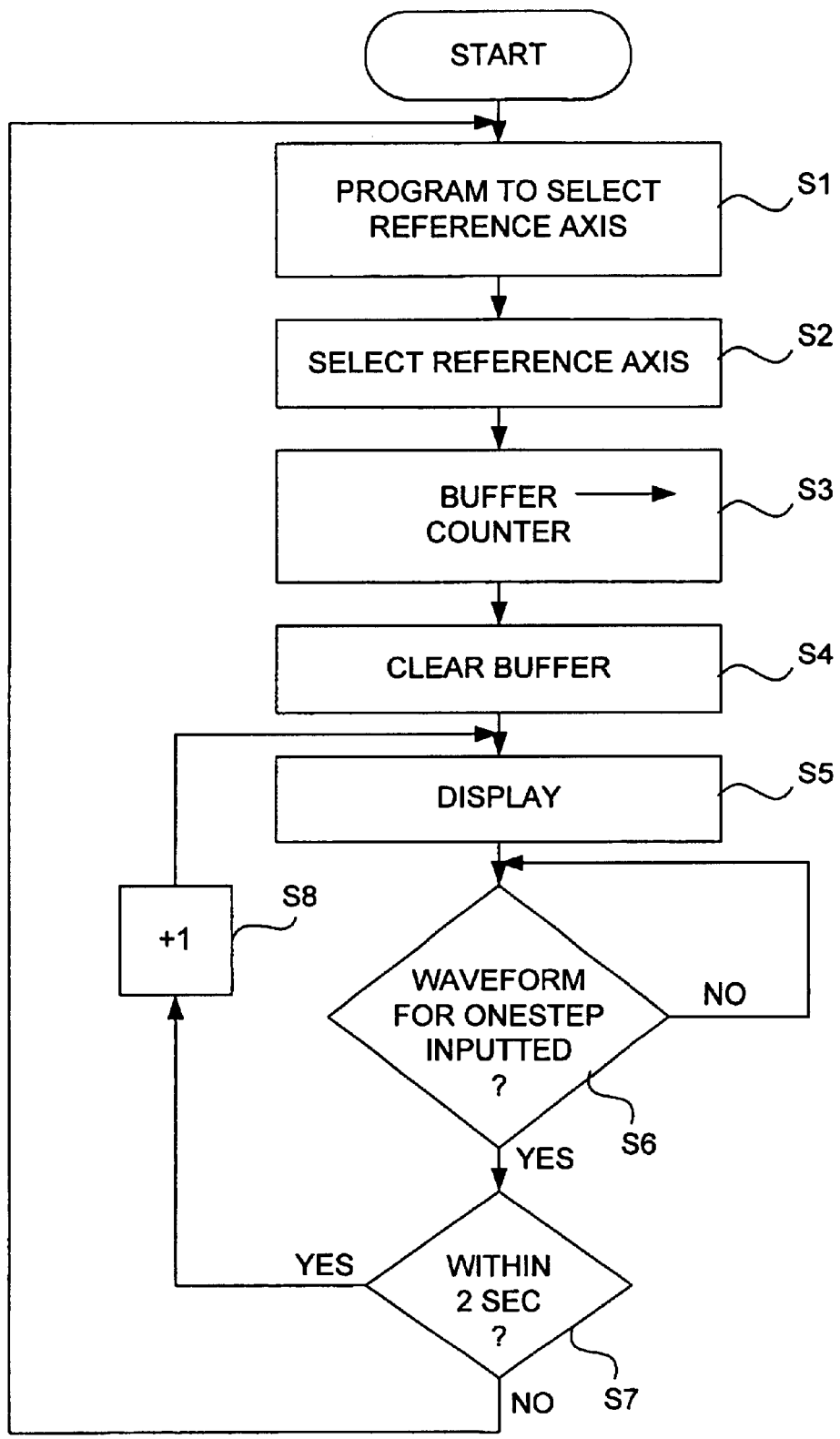
FIG. 6 is a flowchart for a routine for counting the number of steps with the pedometer of this invention.

The pedometer according to this invention, such as described above, may be used to count steps by a main routine shown by the flowchart of FIG. 6. The routine is started as signals from the body motion sensors are received by the reference axis selecting part 21 and a program is run for the selection of a reference axis (Step S1), as will be described in detail below, and a reference axis is thereby selected (Step S2). Next, the output data from the body motion sensors corresponding to this selected reference axis are transmitted from a buffer to the step counter 23 to count the step number (Step S3) and to erase the data in the buffer (Step S4). The step number counted by the step counter 23 is then displayed on the LCD 2 (Step S5). In other words, what is then displayed on the LCD 2 is the number of steps as detected by the body motion sensor corresponding to the selected reference axis. Next, it is checked whether a waveform corresponding to one step has been inputted or not (Step S6). This step is repeated until the waveform of one step is inputted. When the waveform corresponding to one step is inputted, it is checked whether this was inputted within 2 seconds (Step S7). If it was within 2 seconds, the number counted by the step counter 23 is increased by 1 (Step S8) and the program returns to Step S5. If it was not within 2 seconds, the program returns to Step S1.

Next, the procedure for selecting the reference axis is explained with reference to the flowchart of FIG. 7 for a case where body motion sensors are acceleration sensors and the number of acceleration waveforms which are obtained within a specified time period when analyzing the waveforms outputted therefrom while the user is walking is depended upon. For the convenience of description of this procedure with reference to FIG. 7, two body motion sensors for two different directions (axes) are referred to as the first and second sensors (Sensor #1 and #2 in FIG. 7).

The procedure is started by starting a timer (Step S11), and waveform analyses are carried out on the signals outputted from the first and second sensors (Steps S12 and S13, respectively). FIG. 8 shows examples of the waveforms thus obtained from the sensors, the horizontal axes being time axes and the vertical axes representing acceleration which may be in the unit of voltage. The program keeps checking the timer until a time period of 4 seconds (as an example of specified time length) has passed (Step S14). After a time period of 4 seconds has passed, a comparison is made between the numbers (referred to as Buffer 1 and Buffer 2 in FIG. 7) of waveforms obtained from the signals outputted respectively from the first and second sensors during this period of time while the user is walking and stored respectively in first and second buffers (Step S15). If Buffer 1 is found to be equal to or greater than Buffer 2, the direction defined by the first sensor is selected as the reference axis (Step S16). If Buffer 1 is found to be smaller than Buffer 2, the direction defined by the second sensor is selected as the reference axis (Step S17). In other words, the direction associated with the sensor which outputted more waveforms is selected as the reference axis.

Figure 9A:
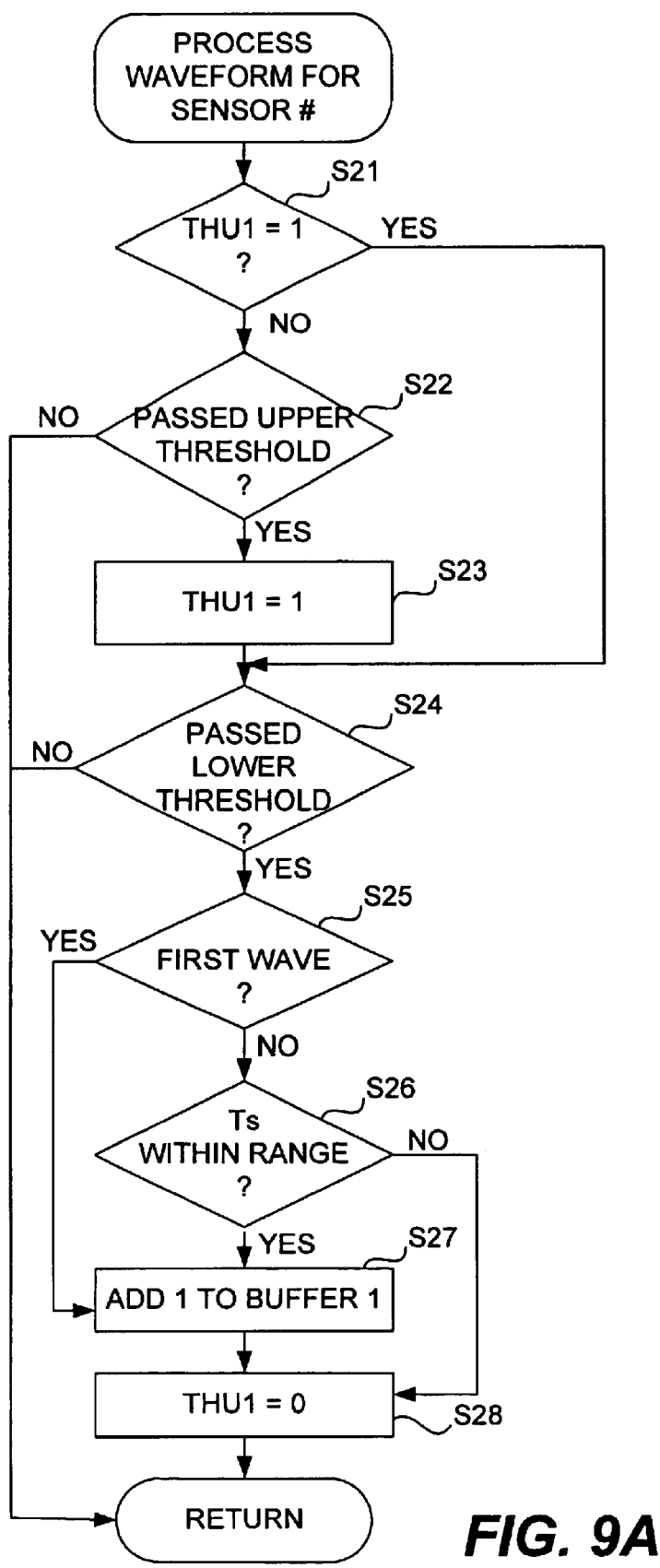
FIGS. 9A and 9B are flowcharts for waveform processing routines for obtaining the waveforms of FIGS. 8A and 8B.
Figure 9B:
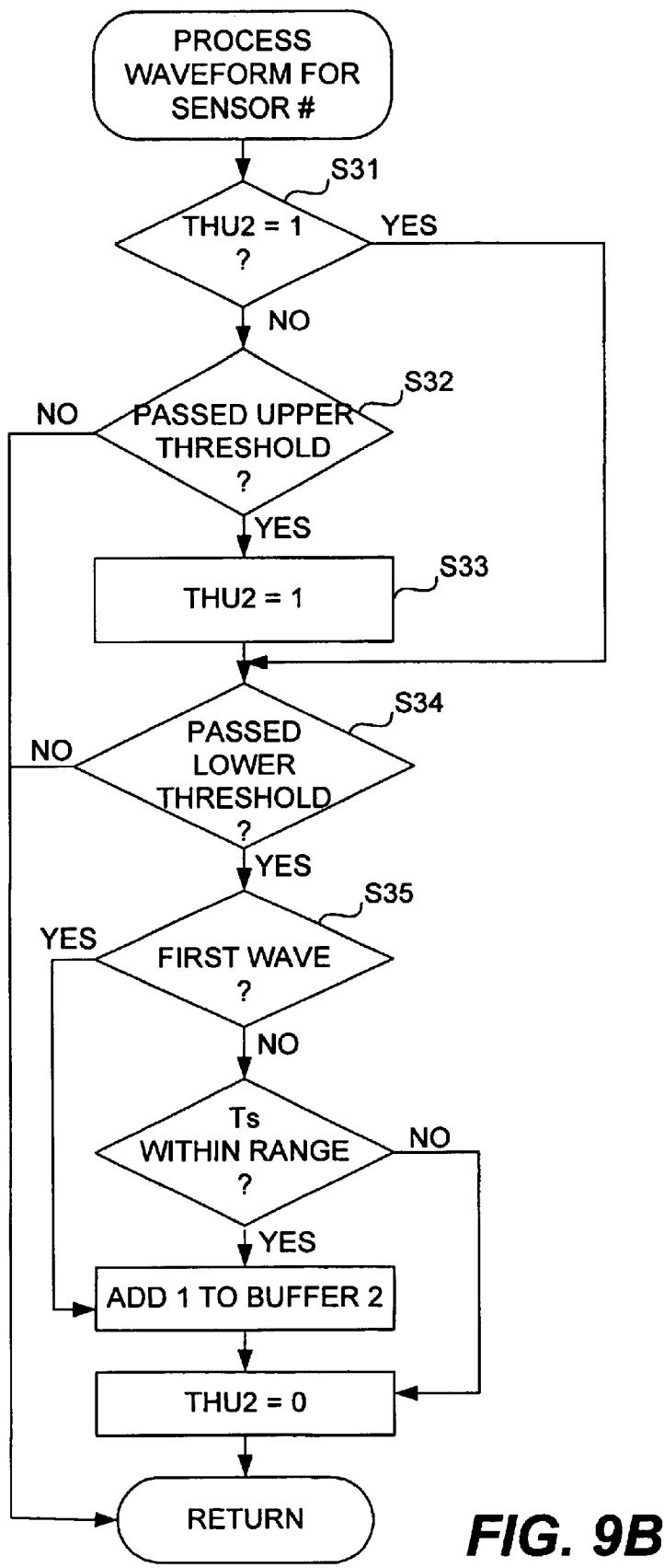

Routines for signal processing to obtain waveforms from the output signals from the aforementioned first and second (body motion) sensors are shown respectively in FIGS. 9A and 9B. Since they are similar, only the routine for the first sensor will be explained below with reference to FIG. 9A.

The program starts by referencing a flag (Thu1) to check whether or not the acceleration waveform from the signal outputted from the first sensor is already exceeding a specified upper threshold value (Step S21). If Thu1=0, the program waits until the waveform exceeds the upper threshold value (Step S22) and then sets flag Thu1 equal to 1 (Step S23), proceeding to check if the waveform has moved below a specified lower threshold value (Step S24). If Thu1=1 in Step S21, the program proceeds directly to Step S24. Step S24 is continued until the waveform moves below the lower threshold value and then it is checked whether it was the first wave that has been detected (Step S25). In the case of an acceleration waveform obtained while the user was walking and if it was the first detected wave, the number already in the first buffer (Buffer 1) is unconditionally increased by 1 (Step S27). If it was the second or later wave that has been detected, it is checked whether the time length Ts since the previous wave was within a specified range (say, $Ts_{min} \leq Ts \leq Ts_{max}$) (Step S26), and Buffer 1 is increased by 1 (Step S27) if Ts was within this range. Flag Thu1 is thereafter set equal to 0 (Step S28) and this is repeated until the timer indicates that a period of 4 seconds has passed. In the above, Step S26 is for the purpose of removing from the output signal of the body motion sensor those signals not related to the user's walking.

Thus, since output signals are extracted by software from a body motion sensor without requiring any physical means for detecting the orientation of the apparatus such as a mechanical angle sensor, the present invention can provide an inexpensive and compact pedometer. Although the invention was described above by way of a pedometer, it goes without saying that the invention, as described above, can be applied to apparatus of other kinds for detecting a body motion and making use of such detected body motion and that apparatus embodying this invention may include those adapted to convert signals into an indicator other than the number of steps.

A second embodiment of the invention is described next with reference to FIG. 10. Since the second embodiment is the same as the first embodiment regarding the inner structure of the pedometer and the routine for the calculation of the number of steps, only the different portion of the second embodiment will be explained. The difference is in that the reference axis is selected by using power values of the acceleration waveform for the analysis of the acceleration waveform obtained while the user is walking.

Figure 7:
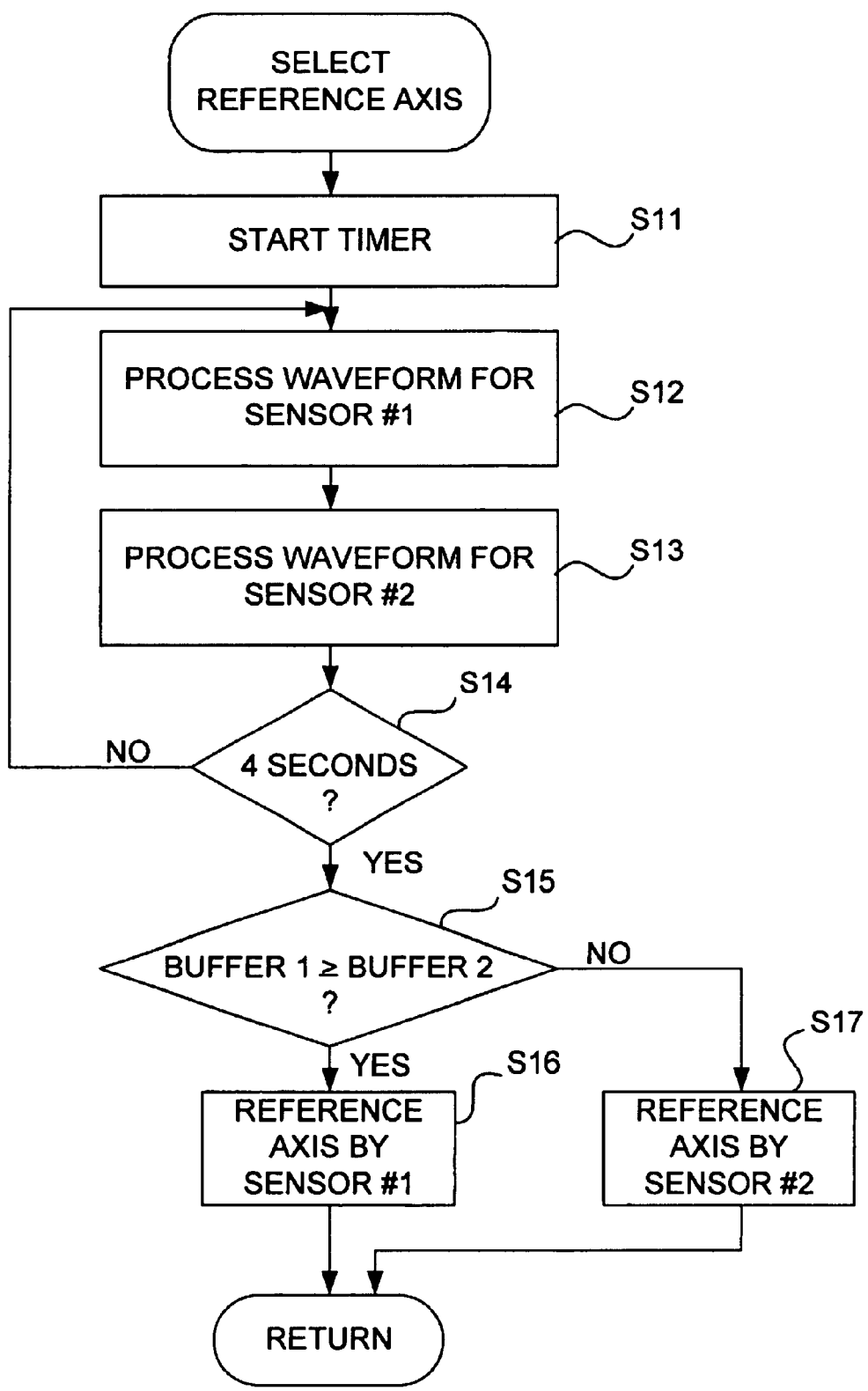
FIG. 7 is a flowchart for a routine embodying this invention for selecting a reference axis.
Figure 10:
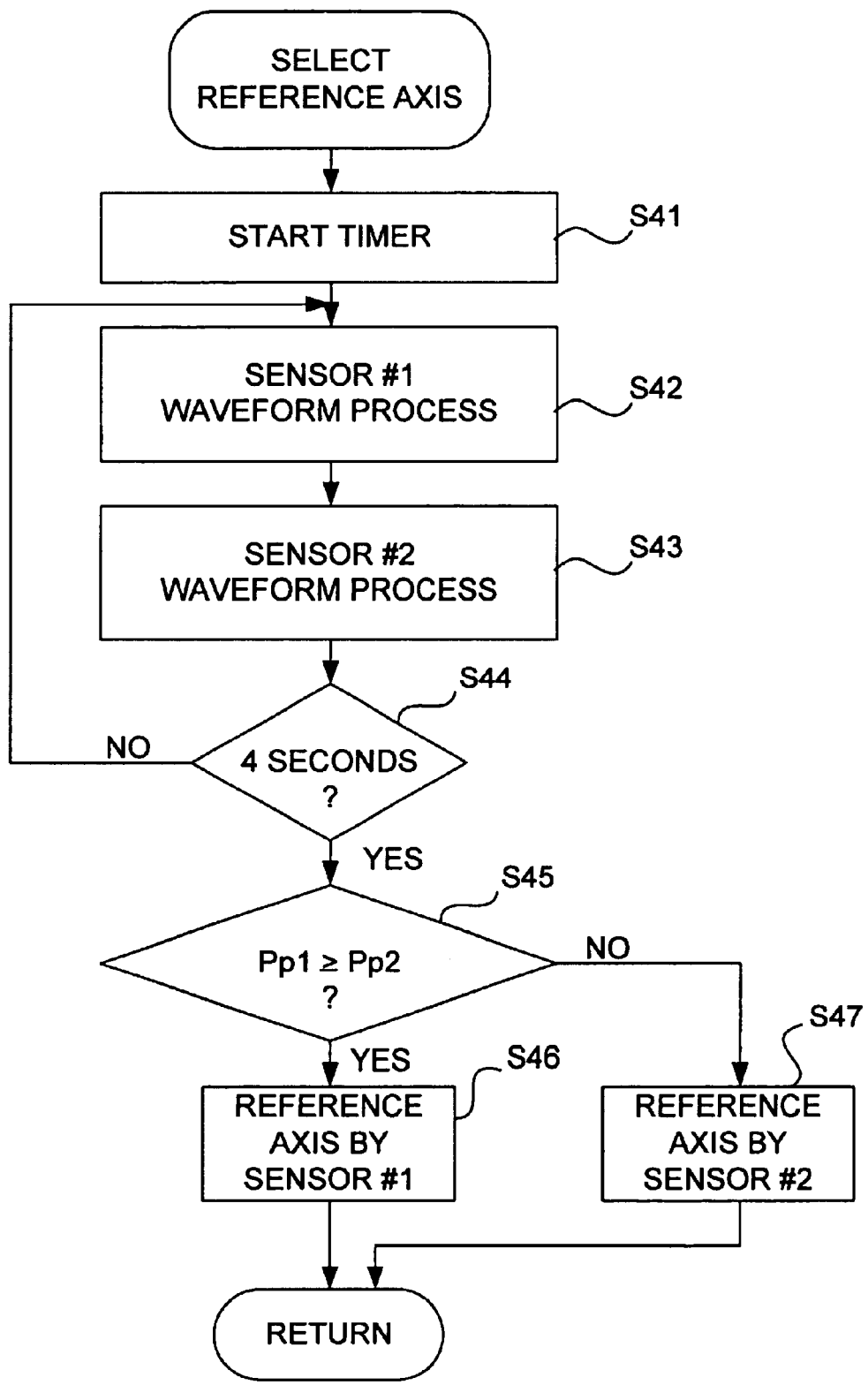
FIG. 10 is a flowchart for a routine according to a second embodiment of this invention for selecting a reference axis.

In the flowchart of FIG. 10, the first steps (Steps S41, S42, S43 and S44) are the same as the corresponding steps in the flowchart of FIG. 7 and hence will not be explained repetitiously. At the point in time when the timer has counted 4 seconds, however, (YES in Step S44), the sums of the squares of the power values of the first three waves obtained during this 4-second period from the first and second sensors are compared (Step S45). The power value is defined as the maximum algebraic difference between the maximum and minimum of an acceleration waveform within a specified range. Thus, if Pp(i) indicates the power value for the ith wave, the values of sum $\{Pp(1)\}^2+\{Pp(2)\}^2+\{Pp(3)\}^2$ obtained for the first sensor and the second sensor are compared, and the direction of the sensor for which this sum value is larger is selected as the reference axis (Step S46 or S47). As an alternative, a comparison may be made of the absolute values of the power values 1

Figure 11B:
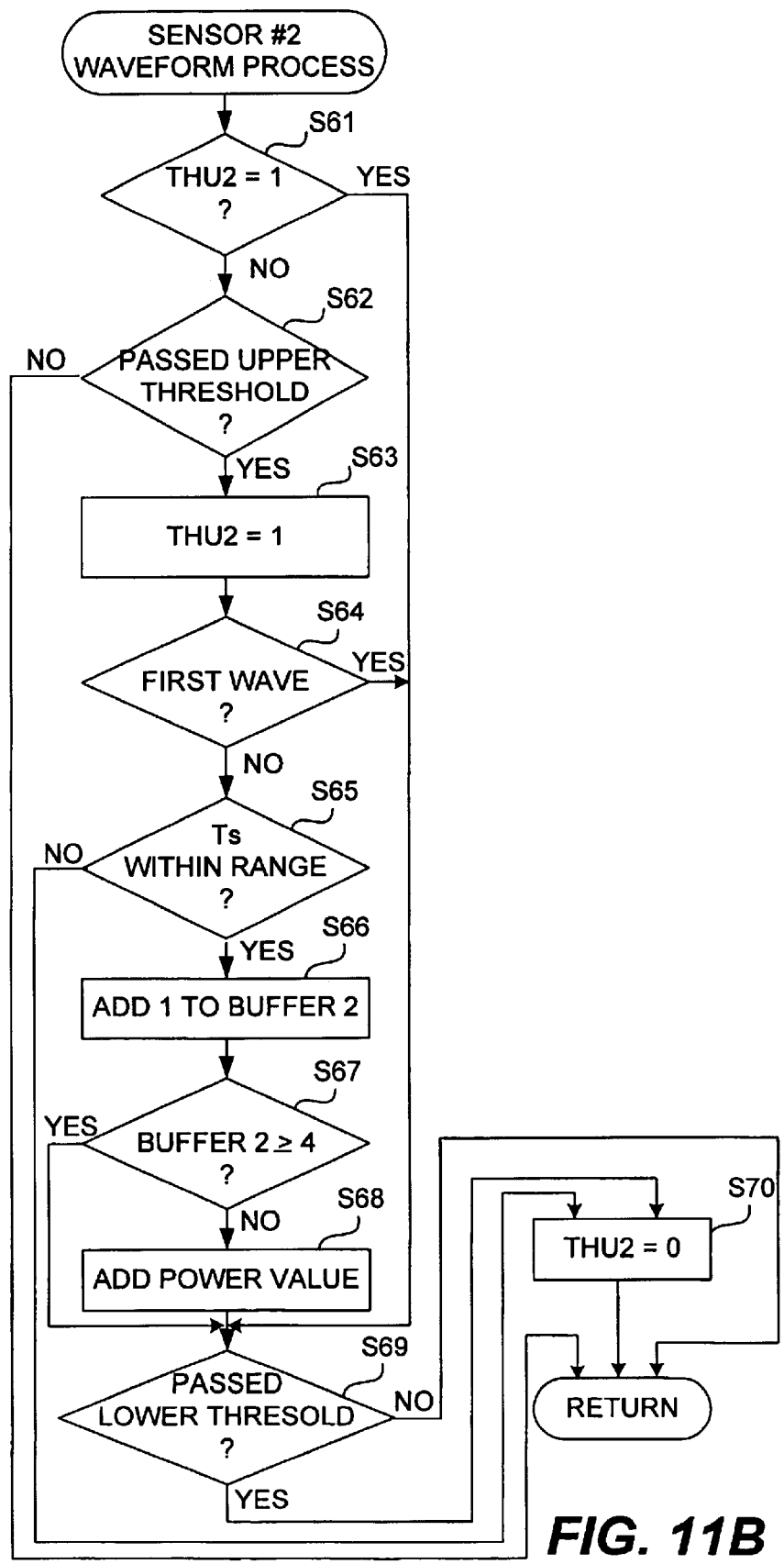

FIG. 11A shows a routine for processing the waveform outputted from the first sensor, and FIG. 11B shows a routine for processing the waveform outputted from the second sensor. Since they are similar, only the flowchart of FIG. 11A will be explained below.

The program starts by referencing a flag (Thu1) to check whether or not the acceleration waveform from the signal outputted from the first sensor is already exceeding a specified upper threshold value (Step S51). If Thu1=0, the program waits until the waveform exceeds the upper threshold value (Step S52). When the waveform exceeds the upper threshold value, flag Thu1 is set equal to 1 (Step S53) and it is checked whether it was the first wave (Step S54). If it was the first wave, the program proceeds to Step S59 to check whether the waveform moved below a specified lower threshold value. If it was the second or later wave, it is checked if the time length Ts since the previous wave was within a specified range (say, $Ts_{min} \leq Ts \leq Ts_{max}$) (Step S55). If Ts is within this range, the value stored in a buffer is increased by 1 (Step S56) and the power value $(Pp)^2$ of the acceleration waveform is calculated and added to the power value of the previous waveform (Steps S57 and S58). For example, the power values of the first three waves obtained in a 4-second period of time may be added.

If Thu1=1 in Step S53 or if it was found in Step S54 that it was the first waveform, the program proceeds to Step S59 to compare the waveform with a specified lower threshold value. The comparison in Step S59 is repeated until the waveform is below the lower threshold value. Flag Thu1 is thereafter set equal to 0 (Step S60), and this is repeated until the timer counts 4 second.

The example described above is not intended to limit the scope of the invention. The addition of power values need not be over the first three waves. It may be over only two waves or over more than three waves. Moreover, the addition need not start from the first wave.

Figure 12:
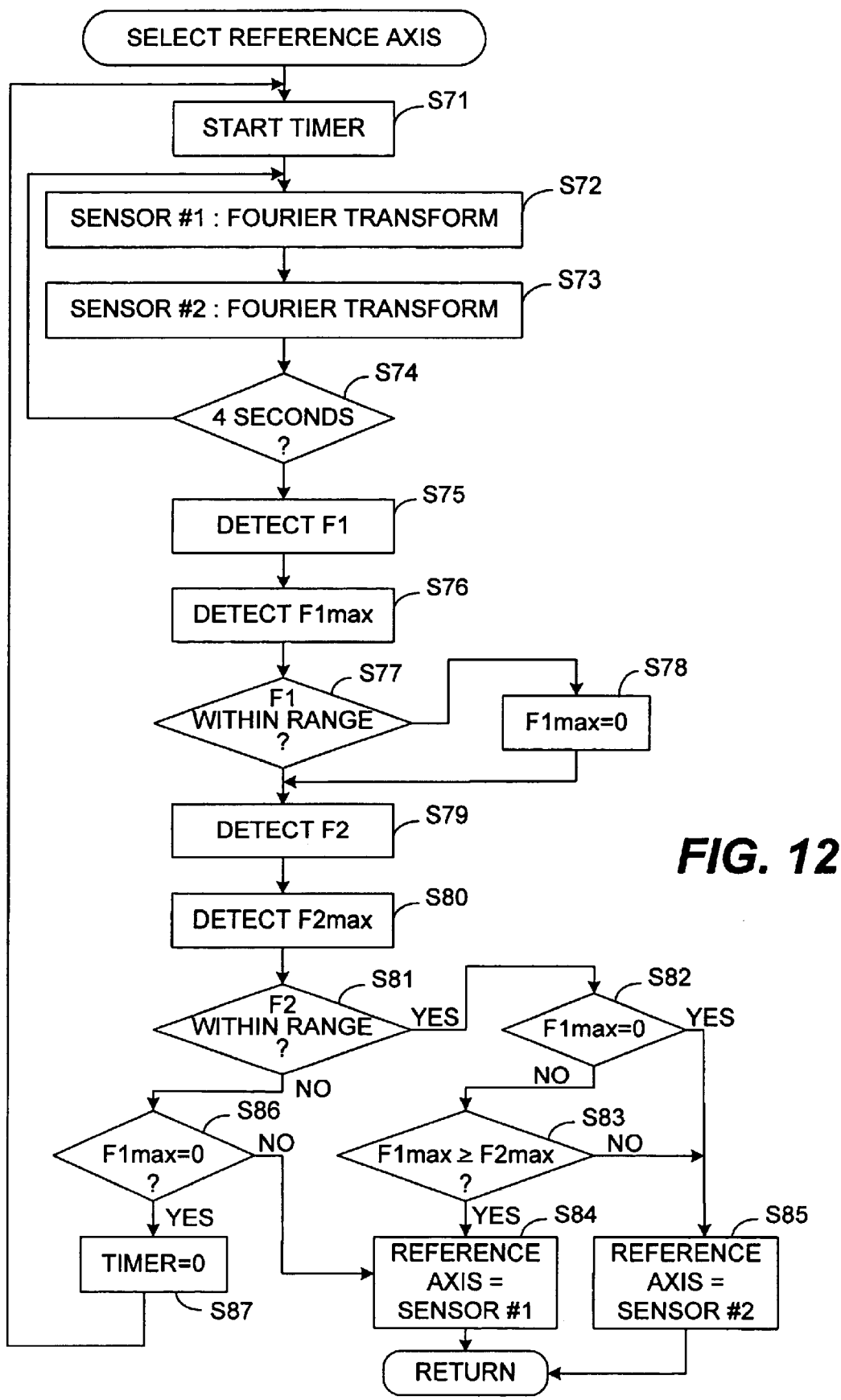
FIG. 12 is a flowchart for a routine according to a third embodiment of this invention for selecting a reference axis.

Next, FIG. 12 will be referenced to describe a third embodiment of the invention, characterized in that the frequency of the acceleration waveform obtained while the user is walking is analyzed. Since this embodiment, too, is similar to the first embodiment regarding the inner structure of the pedometer and the routine for the calculation of the number of steps, only the different portion will be explained.

Figure 13A:
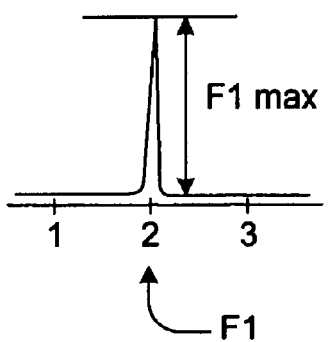
FIGS. 13A and 13B are acceleration waveforms Fourier transformed according to a third embodiment of the invention.
Figure 13B:
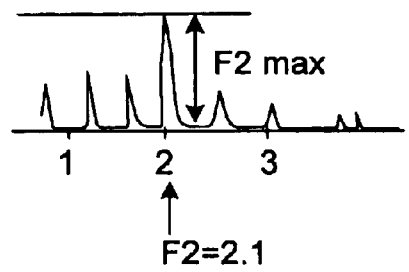

As shown in FIG. 12, the program starts by starting a timer (Step 71) and the acceleration waveforms obtained by the first sensor (Sensor #1) and the second sensor (Sensor #2) are Fourier-transformed (Steps S72 and S73). FIGS. 13A and 13B show examples of the frequency distributions thus obtained by Fourier-transforming the acceleration waveforms obtained respectively from the first sensor and the second sensor. FIG. 13A shows an example of a frequency distribution with extremely few variations, having a high peak of height $F1_{max}$ at frequency F1 of 2 Hz. FIG. 13B shows another frequency distribution with some variations, having a relatively low peak of height $F2_{max}$ at frequency F2 of 2.1 Hz and several other lower peaks at other frequencies. This example shows a situation where changes in acceleration due to detectable body motions are detected in the direction of the first sensor and while signals including unnecessary vibrations different from the detectable body motions are being detected in the direction of the second sensor.

Steps S72 and S73 are repeated until the timer indicates that 4 seconds have elapsed (Step S74). At the point in time when the timer has counted 4 seconds, the acceleration waveform obtained from the first sensor is analyzed and the frequency (F1) corresponding to the maximum peak and its height ($F1_{max}$=the maximum power value) are determined (Steps S75 and S76). Next, it is checked whether or not F1 is within a specified range (Step S77) and $F1_{max}$ is cleared with zero if F1 is not within the specified range (Step S78). In the example of FIG. 12, this range is specified as between 1 Hz and 3 Hz. A similar analysis is carried out on the acceleration waveform obtained from the second sensor to obtain the frequency (F2) of its maximum peak and the value of this maximum peak ($F2_{max}$=the maximum power value) (Steps S79 and S80) and it is checked whether F2 is within a specified range (Step S81). If F2 is within the specified range, it is further checked whether $F1_{max}$ is 0 or not (Step S82). The direction of the second sensor is selected as the reference axis if $F1_{max}$ is 0 (Step S85). If $F1_{max}$ is not 0, it is checked whether or not $F1_{max}$ is equal to or greater than $F2_{max}$ (Step S83). If $F1_{max}$ is equal to or greater than $F2_{max}$, the direction of the first sensor is selected as the reference axis (Step S84). If F2 is outside the specified range in Step S81, it is checked whether or not $F1_{max}$ is 0 (Step S86) and the direction of the first sensor is selected as the reference axis if $F1_{max}$ is not equal to 0 (Step S84). If $F1_{max}$ is zero in this case, the timer is reset to zero (Step S87) and the process is repeated from Step S71.

Figure 14:
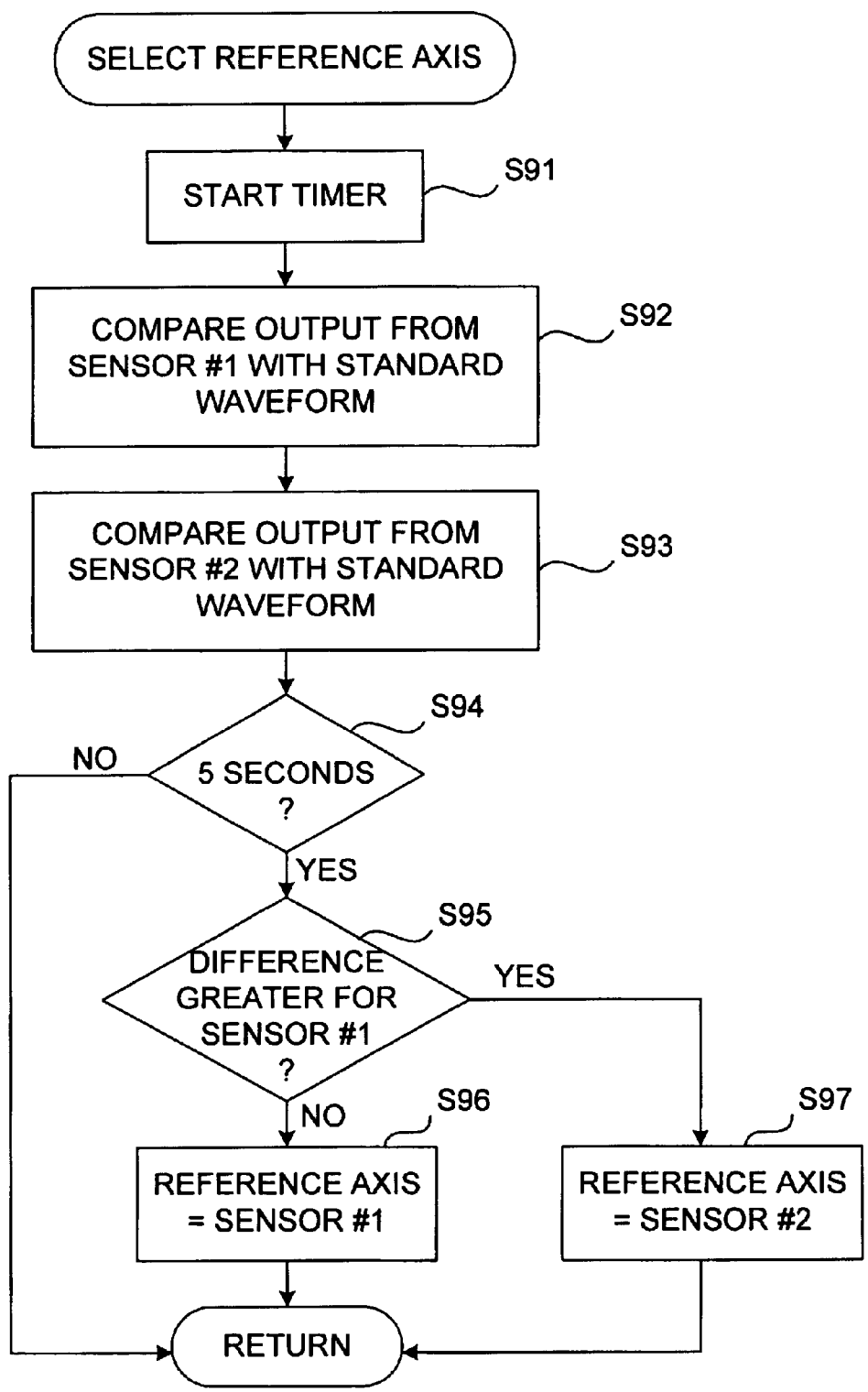
FIG. 14 is a flowchart for a routine according to a fourth embodiment of this invention for selecting a reference axis.

Next, FIG. 14 will be referenced to describe a fourth embodiment of the invention, characterized in that the pattern of the acceleration waveform obtained while the user is walking is analyzed. Since this embodiment, too, is similar to the first embodiment regarding the inner structure of the pedometer and the routine for the calculation of the number of steps, only the different portion will be explained.

As shown in FIG. 14, the program starts by starting a timer (Step 91) and the acceleration waveforms obtained by the first sensor (Sensor #1) and the second sensor (Sensor #2) are compared with a standard waveform (Steps S92 and S93). The standard waveform may be prepared, for example, from preliminarily collected data and is used for comparisons with detected waveforms at the time of a measurement. Steps S92 and S93 are repeated until the timer counts 5 seconds (Step S94), and a reference axis is selected from the result of analyses on the patterns of the waveforms obtained during these 5 seconds. According to one example, this is done by examining whether the difference from the standard pattern is greater for the acceleration waveform obtained from the first sensor or for that from the second sensor (Step S95). If the difference from the standard pattern is greater for the acceleration pattern obtained from the first sensor, the direction of the second sensor is selected as the reference axis (Step S97). If the difference from the standard pattern is equal or smaller for the acceleration pattern obtained from the second sensor to or than that from the first sensor, the direction of the first sensor is selected as the reference axis (Step S96).

For the pattern analysis described above, the comparisons with the preliminarily prepared standard pattern may be made in terms of the wave height, the width of the waveform, the intervals between (or the period of) the peaks and/or the numbers of hills and valleys within one wave. Use may also be made of the stability in the appearance of the detected waveform by using such parameters or any method of waveform analysis such as a method of cluster analysis.

Next, there is explained a fifth embodiment of the invention characterized in that a pedometer with body motion sensors of a different kind is used. Since this embodiment is different from the first through fourth embodiments of the invention described above in all other aspects, only the structure of the body motion sensors used in this embodiment will be explained.

Figure 15A:
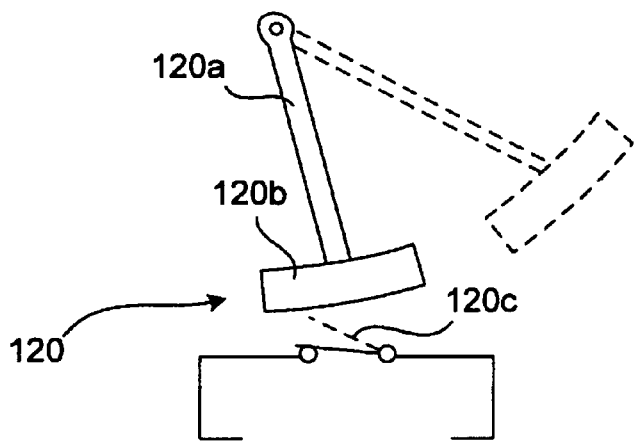
FIG. 15A is a sketch of a body motion sensor according to a fifth embodiment of the invention and FIG. 15B shows a waveform of signal outputted from the body motion sensor of FIG. 15A.

FIG. 15A shows a body motion sensor 120 used in the fifth embodiment of this invention. This is also an acceleration sensor adapted to output signals which change according to the acceleration caused by a body motion. This body motion sensor 120 comprises a pendulum 120a, adapted to oscillate around a support point (fulcrum) and provided with a magnet 120b at its free end, and a lead switch 120c which is disposed near the swinging path of the pendulum 120a and is switched on as the magnet 120b approaches it and off as the magnet 120b moves away from it. The range of the swinging motion of the pendulum 120a is limited by stoppers (not shown), and a biasing means such as a spring is provided such that the pendulum 120a will return to a specified normal position. If the pendulum 120a swings due to its acceleration caused by a body motion, it is detected by a change in voltage or current caused by the opening and closing of the lead switch 120c as a result of the motion of the magnet 120b.

Figure 15B:
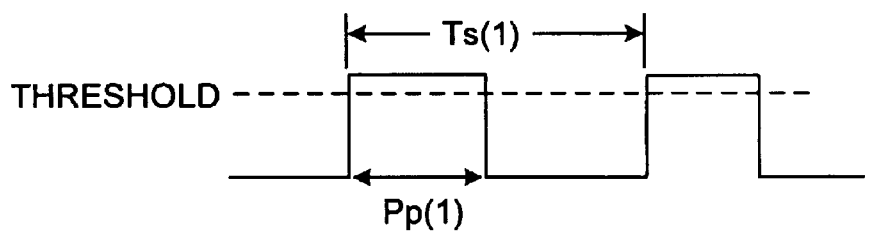

The output signal from the body motion sensor 120 is a pulse signal such as shown in FIG. 15B. The interval Ts(1) between the pulses may be defined similarly as in the case of the waveform analysis explained above with reference to FIG. 8. In this example, the pulse width is defined as the power value Pp(1) because the amplitude of oscillation of the pendulum 120a increases as the acceleration due to a body motion increases and the time during which the magnet 120b remains close to the lead switch 120c becomes longer, the pulse thereby becoming wider.

The method of selecting a reference axis according to the first embodiment of the invention can be applied to the body motion sensor 120 if the number of acceleration waveforms is used as the number of pulses. The method according to the second embodiment of the invention can be used if Pp is defined as above. The methods according to the third and fourth embodiments of the invention can also be used since these methods of analysis are applicable to pulse signals.

As a variation of the fifth embodiment of the invention described above, the free end of the pendulum may be used as a photo-interrupter for closing a path of light.

Described next will be a body motion detector according to a sixth embodiment of the invention characterized as being capable of detecting its orientation, as it is attached to or carried by a user, from the output signals from body motion sensors and measuring the number of steps being taken by the user and also determining whether the user is walking horizontally, walking up or down on stairs, etc.

The principle of judging the orientation of a body motion detector will be explained next with reference to FIGS. 16A and 16B. For the convenience of disclosure, let us assume that the body motion detector comprises body motion sensors as shown at 11 in FIG. 3A. If the body motion detector 11 is orientated as shown in FIG. 16A with the detector 11c positioned on the lower surface of the planar supporting member 11a, it will be defined as being in the first orientation. If the body motion detector 11 is orientated as shown in FIG. 16B with the detector 11c positioned on the upper surface of the supporting member 11a, it will be defined as being in the second orientation. FIGS. 16A and 16b show examples of acceleration waveforms outputted from the body motion sensor 11 respectively in the first and second orientations when there is a motion as indicated by the double-headed arrows. It is to be noted that the direction of motion is the same for the two cases independent of the orientation of the body motion sensor 11 but the outputted waves are different, depending on whether the detector 11c is above or below the supporting member 11a because the deformation of the piezoelectric element will be different between the two different orientations. If the waveform, as shown in FIG. 16A, obtained from the body motion sensor 11 in its first orientation shown is called the positive waveform, the waveform obtained from the body motion sensor 11 in its second orientation will be an inversion of the positive waveform, or the negative waveform, as shown in FIG. 16B.

Thus, if patterns of acceleration waveforms caused by different motions while the body motion detector (or the body motion sensor) is in a standard orientation with respect to the user or the space are preliminarily stored, it is possible to judge the orientation of the body motion detector by comparing the acceleration waveform therefrom with such stored patterns. In other words, the orientation of the body motion detector can be determined by an software operation on the signals outputted from the body motion sensor without requiring any mechanical device for detecting the orientation.

Figure 17:
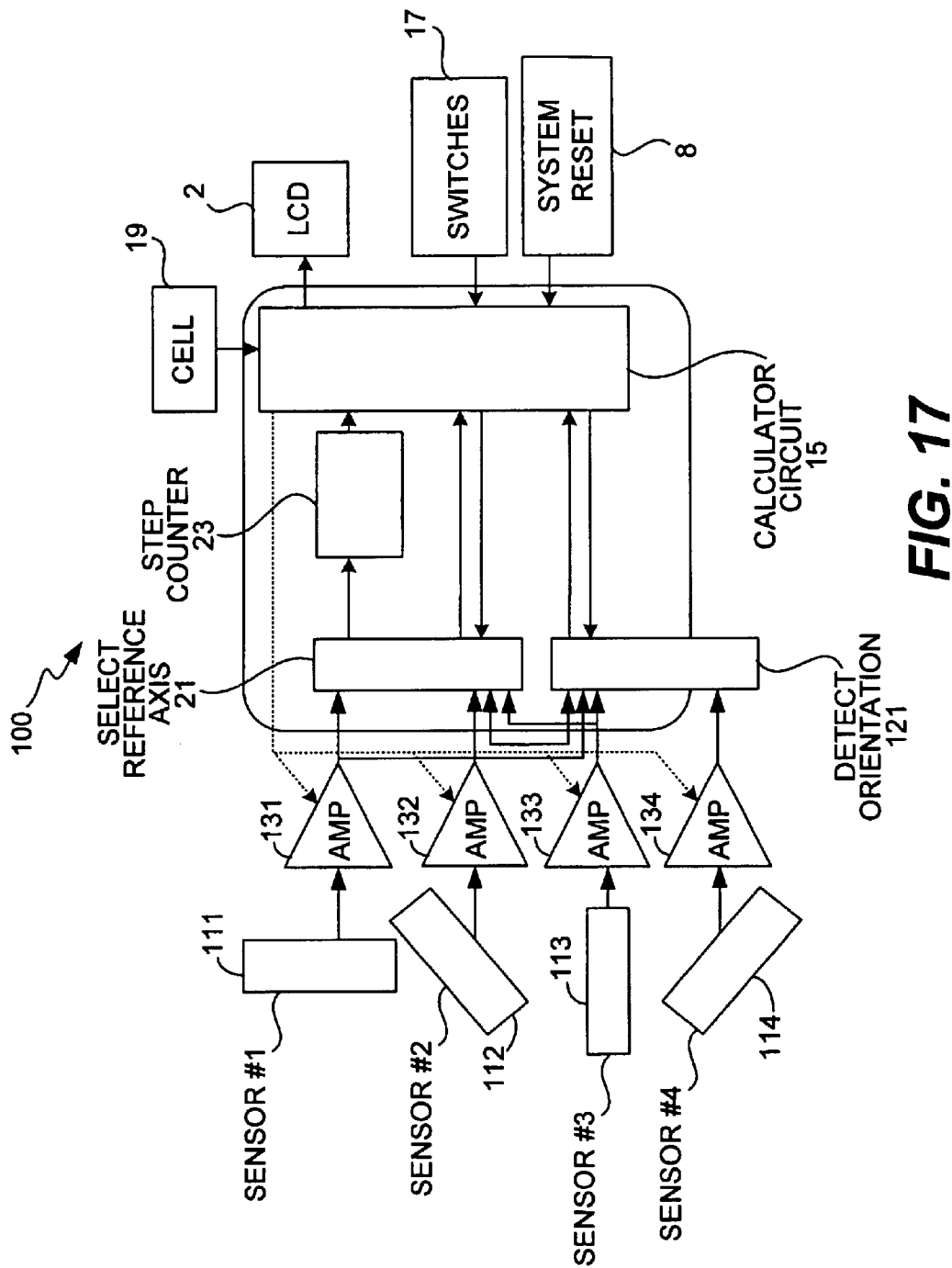
FIG. 17 is a block diagram of a body motion detector according to the sixth embodiment of the invention.

A body motion detector 100 according to the sixth embodiment of the invention, operating under this principle, is structured as shown in FIG. 17 wherein components which are like those of a body motion detector according to the first embodiment of the invention are indicated by the same numerals as in FIG. 5 and such like components will not be explained repetitiously.

According to this embodiment of the invention, signals from the body motion sensors 111–114 are inputted to an orientation detecting means 121 and the calculator circuit 15 serves as a body motion detecting means to carry out calculations to identify the form of walking, etc. based on the orientation detected by the orientation detecting means 121. According to the illustrated example, there are also a reference axis selecting part 21 and a step counter 23 but these components may be dispensed with.

Figure 18:
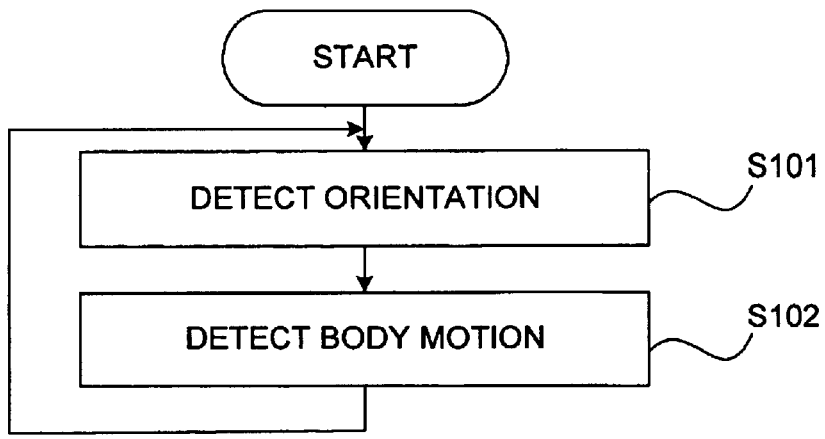
FIG. 18 is a flowchart for a main routine of operations of the body motion detector according to the sixth embodiment of the invention.
Figure 19:
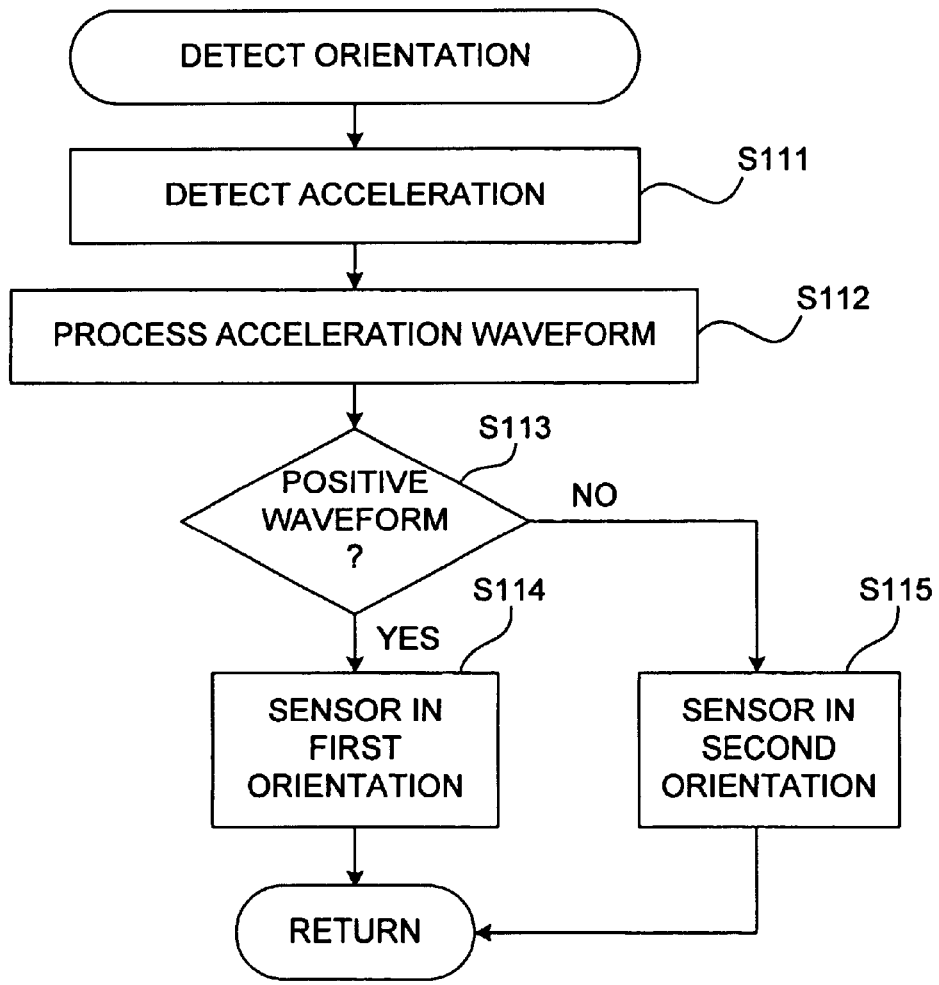
FIG. 19 is a flowchart of a routine for detecting the orientation of the body motion detector according to the sixth embodiment of the invention.

The main routine for the operations by the body motion detector 100 is as shown in FIG. 18, starting as output signals from the body motion sensors 111–114 are received. A procedure for detecting the orientation (Step S101), to be described below with reference to FIG. 19, is carried out on the basis of the output from the amplifier circuits 131–134 connected to the body motion sensors 111–114, and a procedure for detecting the body motion (Step S102) is carried out on the basis of the orientation of the body motion detector 100 detected by the orientation detecting procedure. As an example of the procedure for detecting the body motion, methods of identifying modes of walking shown in the aforementioned Proceedings of the 11th Biophysics and Engineering Symposium BPES 96, pp493–496, may be used. Since the orientation of the body motion detector 100 can be identified by this procedure even if it is being carried by or attached to the user, it is possible to detect body motions along specified directions such as those of three axes fixed in space or to the user and to identify the mode of walking. The procedures for counting the number of steps explained above with reference to the first through fifth embodiments of the invention may be combined in order to count the number of steps in different modes of walking.

FIG. 19 is an example of flowchart for a subroutine for the aforementioned procedure for detecting orientation. For the convenience of explanation, the subroutine will be described for a situation in which there is only one body motion sensor but the subroutine can also be used in a similar manner for situations where there are a plurality of body motion sensors provided.

After acceleration is detected by the body motion sensor (Step S111), the detected acceleration waveform is subjected to a waveform processing procedure (Step S112) and examined if it is a positive waveform (Step S113), as shown in FIG. 16A, rising in the positive direction. If the direction of the acceleration waveform indicates that it is a positive waveform, it is concluded that the body motion sensor is in the first orientation as shown in FIG. 16A (Step S114). If the direction of the acceleration waveform is inverse to the direction of a positive waveform, it is concluded that the direction of the body motion sensor is as shown in FIG. 16B, that is, it is in the second orientation (Step S115).

Figure 20A:
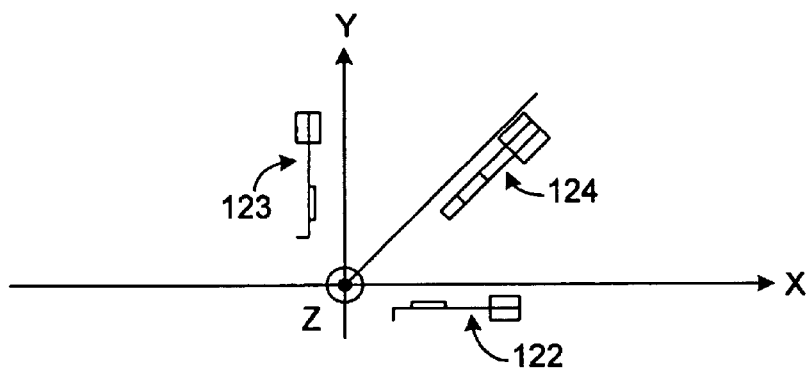
FIGS. 20A, 20B and 20C are diagrams for showing three different manners in which three body motion sensors may be positioned.
Figure 20B:
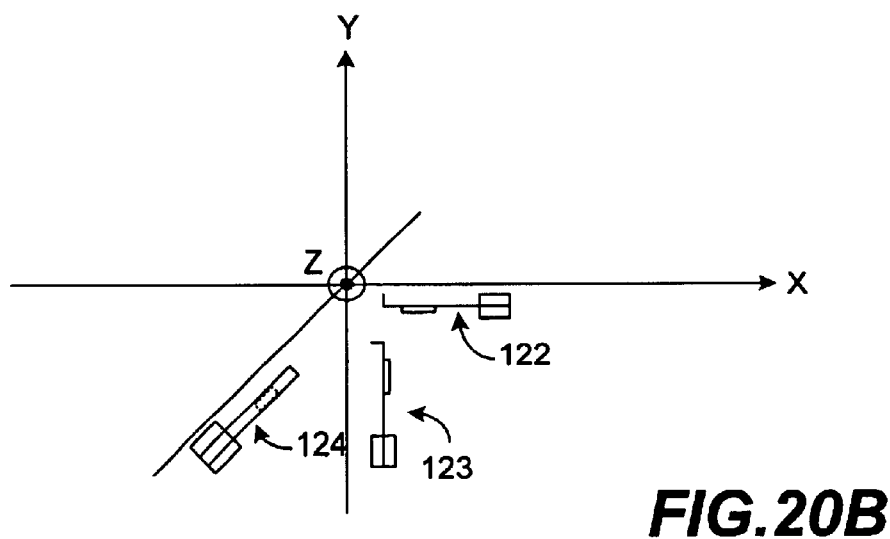
Figure 20C:
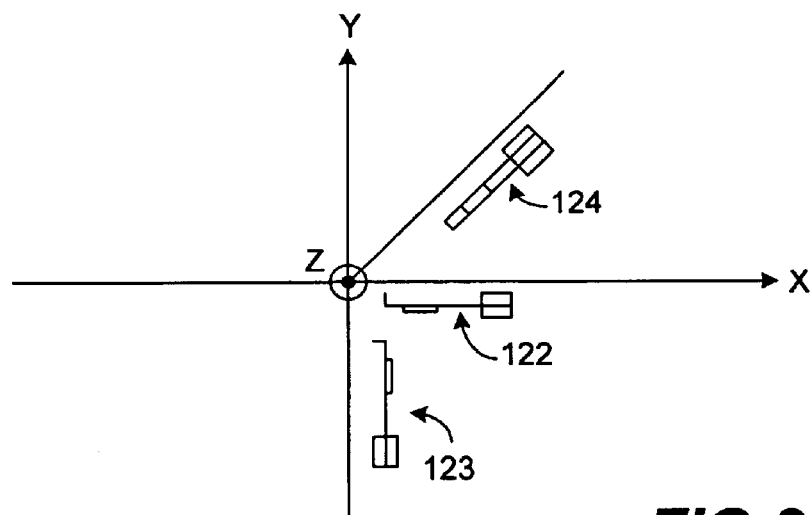

A procedure for detecting the orientation of a body motion detector in a three-dimensional space is explained next in detail. As shown in FIGS. 20A, 20B and 20C, three body motion sensors (hereafter referred to for convenience as "the first sensor 122", "the second sensor 123" and "the third sensor 124") are provided, each of the sensors 122, 123 and 124 being structured as explained above with reference to FIG. 3A. FIG. 20A shows a standard positioning of the sensors 122, 123 and 124 with the first sensor 122 positioned along the X-axis such that its weight is towards the +X-direction, the second sensor 123 positioned along the Y-direction such that its weight is towards the +Y-direction, and the third sensor 124 positioned such that its weight faces the direction which makes angles of 45° with both the +X-direction and the +Y-direction. The detectors (such as shown at 11c in FIG. 3A) of the sensors 122, 123 and 124 are respectively on the side of the +Y-direction, the +X-direction and the +Z-direction. Thus positioned, the sensors 122, 123 and 124 serve to detect the acceleration respectively in the Y-direction, the X-direction and the Z-direction. The three sensors 122, 123 and 124 may be arranged inside a case of a flat shape as shown in FIGS. 3A and 3B.

FIG. 20B shows another standard positioning of the sensors 122, 123 and 124, the first sensor 122 being positioned along the X-axis such that its weight is towards the +X-direction but its detector is towards the −Y-direction, the second sensor 123 being positioned along the Y-axis such that its weight is towards the −Y-direction and its detector is towards the +X-direction, and the third sensor 124 being positioned such that its weight is in the direction making angles of 45° with both the −X-direction and the −Y-direction and its detector is towards the −Z direction. FIG. 20C shows still another standard positioning of the sensors 122, 123 and 124, the first sensor 122 being positioned along the Y-axis such that its weight is towards the −Y-direction and its detector is towards the +X-direction, the second sensor 123 being positioned along the X-axis such that its weight is towards the +X-direction and its detector is towards the −Y-direction, and the third sensor 124 being positioned such that its weight is in the direction making angles of 45° with both the +X-direction and the +Y-direction and its detector is towards the +Z direction.

Figure 21A:
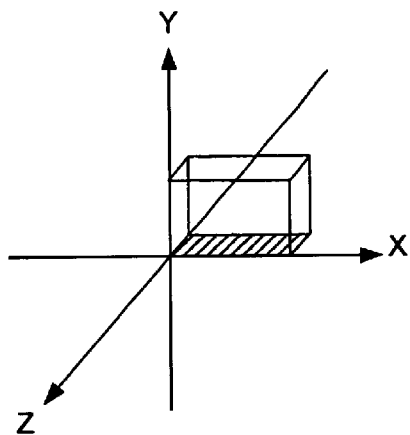
FIG. 21A shows schematically a body motion detector with sensors positioned in a standard manner.
Figure 21B:
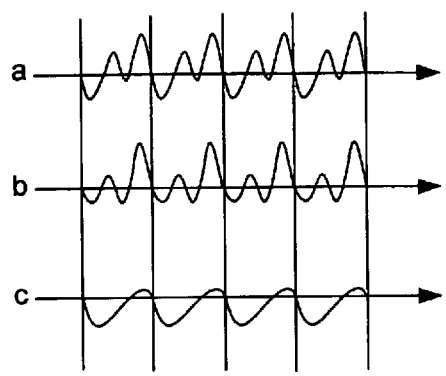
FIG. 21B shows an example of waveforms of signals outputted from the three sensors of the body motion detector positioned as shown in FIG. 21A.

FIG. 21A shows schematically the orientation of the body motion detector in its standard position with respect to the X-, Y- and Z-directions with the sensors 122, 123 and 124, arranged as shown in FIG. 20A. FIG. 21B shows examples of acceleration waveforms (a, b and c) outputted respectively from the sensors 122, 123 and 124 when the user undergoes a certain motion whiling holding the body motion detector in an orientation as shown in FIG. 21A.

Figure 22A:
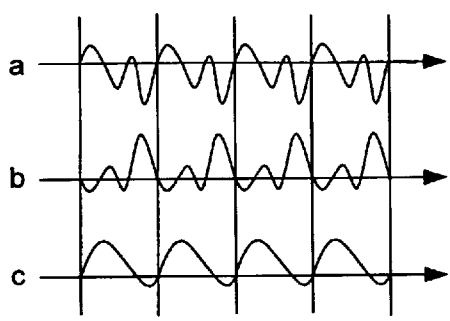
FIG. 22A shows an example of waveforms of signals outputted from the three sensors of the body motion detector of FIG. 21A.
Figure 22B:
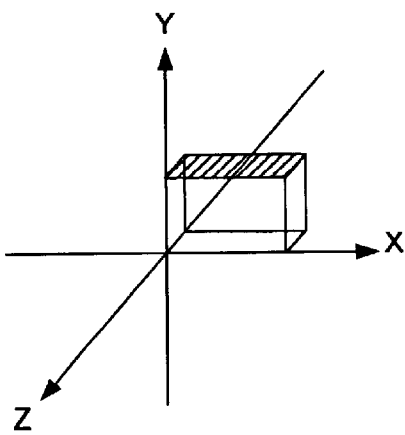
FIG. 22B shows the orientation of the body motion detector of FIG. 21A determined by analyzing the waveforms shown in FIG. 22A.

Let up suppose, as an example, that acceleration waveforms as shown in FIG. 22A (a, b and c) have been outputted respectively from the sensors 122, 123 and 124 while the body motion detector is freely attached to or carried by the user. A pattern analysis procedure may be started by matching the waveform patterns of FIGS. 22A and 21B. In this example, it is noted that the waveform pattern from the first sensor 122 shown in FIG. 22A is an inverse of that shown in FIG. 21B but that the waveform patterns from the second sensor 123 are similar between FIGS. 22A and 21B, the waveform pattern from the third sensor 124 shown in FIG. 22A being an inverse of that shown in FIG. 21B. It can be concluded from this that the body motion detector is oriented as shown in FIG. 22B, that is, its orientation is one obtained by rotating it by 180° around the X-axis from the original orientation shown in FIG. 21A.

Figure 23A:
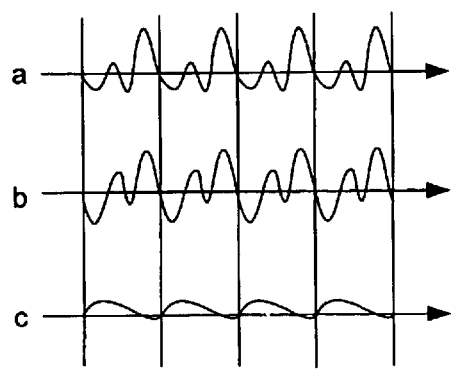
FIG. 23A shows another example of waveforms of signals outputted from the three sensors of the body motion detector of FIG. 21A.
Figure 23B:
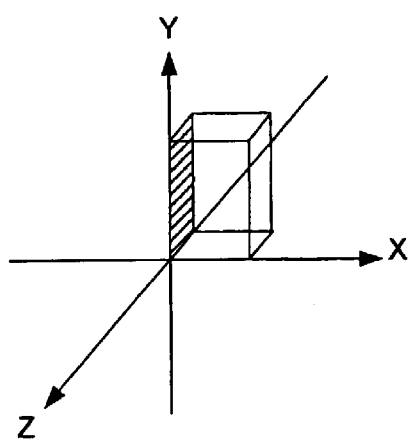
FIG. 23B shows the orientation of the body motion detector of FIG. 21A determined by analyzing the waveforms shown in FIG. 23A.

As another example, let us suppose that acceleration waveform patterns (a, b, c) as shown in FIG. 23A have been obtained respectively from the first, second and third sensors 122, 123 and 124. With reference to the waveform patterns shown in FIG. 21B, it is noted that the waveform pattern from the first sensor 122 appearing in FIG. 23A is similar to that from the second sensor 123 in FIG. 21B, that the waveform pattern from the third sensor 124 in FIG. 23A is an inverse of that from the third sensor 124 in FIG. 21B, and that the waveform pattern from the second sensor 123 shown in FIG. 23A is similar to that from the first sensor 122 shown in FIG. 21B. It can be concluded from this that the body motion detector is oriented this time as shown in FIG. 23B, that is, its orientation is one obtained by rotating it by 90° to the right around the Z-axis from the original orientation shown in FIG. 21A.

Thus, the orientation of the body motion detector can be determined by analyzing outputted waveforms from a plurality of body motion sensors appropriately oriented with respect to one another and this makes it possible to detect body motions independent of the orientation of the body motion detector. In other words, it is not required according to this invention to maintain the body motion detector always in a specified orientation, and the user can freely attach it to the body or carry it. Since the outputted signals from the body motion sensors are analyzed by software calculations, furthermore, there is no need for extra means such as an angle sensor for determining the orientation of the body motion sensor.

What is claimed is:

1. A body motion detector attached to or carried by a user for detecting body motions of said user, said body motion detector comprising:

a plurality of sensors each adapted to detect body motions of said user in a specified direction and to output a body motion signal according to a body motion of said user, each of said plurality of sensors being disposed so as to detect said body motion in a different direction; and selecting means for selecting one of said plurality of sensors by carrying out calculations on signals outputted from said plurality of sensors, said body motion detector detecting said body motion in a specified direction selectively from output signals from the selected body motion sensor.

2. The body motion detector of claim 1 wherein said selecting means includes analyzing means for analyzing waveforms of signals outputted from said sensors.

3. The body motion detector of claim 2 wherein said analyzing means carries out one or more kinds of analysis selected from the group consisting of:

counting the number of those of said signals received within a specified length of time with waveforms satisfying a specified condition;

calculating the size of said waveforms;

analyzing the frequency of said waveforms; and analyzing patterns of said waveforms.

4. The body motion detector of claim 1 wherein each of said sensors outputs signals which vary according to acceleration caused by said body motions.

5. The body motion detector of claim 2 wherein each of said sensors outputs signals which vary according to acceleration caused by said body motions.

6. The body motion detector of claim 3 wherein each of said sensors outputs signals which vary according to acceleration caused by said body motions.

7. The body motion detector of claim 1 wherein said body motions include one or more motions selected from the group consisting of walking and running.

8. The body motion detector of claim 2 wherein said body motions include one or more motions selected from the group consisting of walking and running.

9. The body motion detector of claim 3 wherein said body motions include one or more motions selected from the group consisting of walking and running.

10. The body motion detector of claim 4 wherein said body motions include one or more motions selected from the group consisting of walking and running.

11. The body motion detector of claim 5 wherein said body motions include one or more motions selected from the group consisting of walking and running.

12. The body motion detector of claim 6 wherein said body motions include one or more motions selected from the group consisting of walking and running.

13. A body motion detector attached to or carried by a user for detecting body motions of said user, said body motion detector comprising:

a plurality of sensors each adapted to detect body motions of said user in a specified direction and to output a body motion signal according to a body motion of said user, each of said plurality of sensors being disposed so as to detect said body motion in a different direction;

reference orientation detecting means for detecting the initial orientation of said body motion detector from signals outputted from said plurality of sensors; and body motion detecting means for detecting body motions of said user by carrying out calculations on said signals outputted from said plurality of sensors, said calculations corresponding to the initial orientation of said body motion detector detected by said reference orientation detecting means.

* * * * *